INVENTORS
H. D. LYONS
G. NOWLIN

BY

*Hudson & Young*

ATTORNEYS

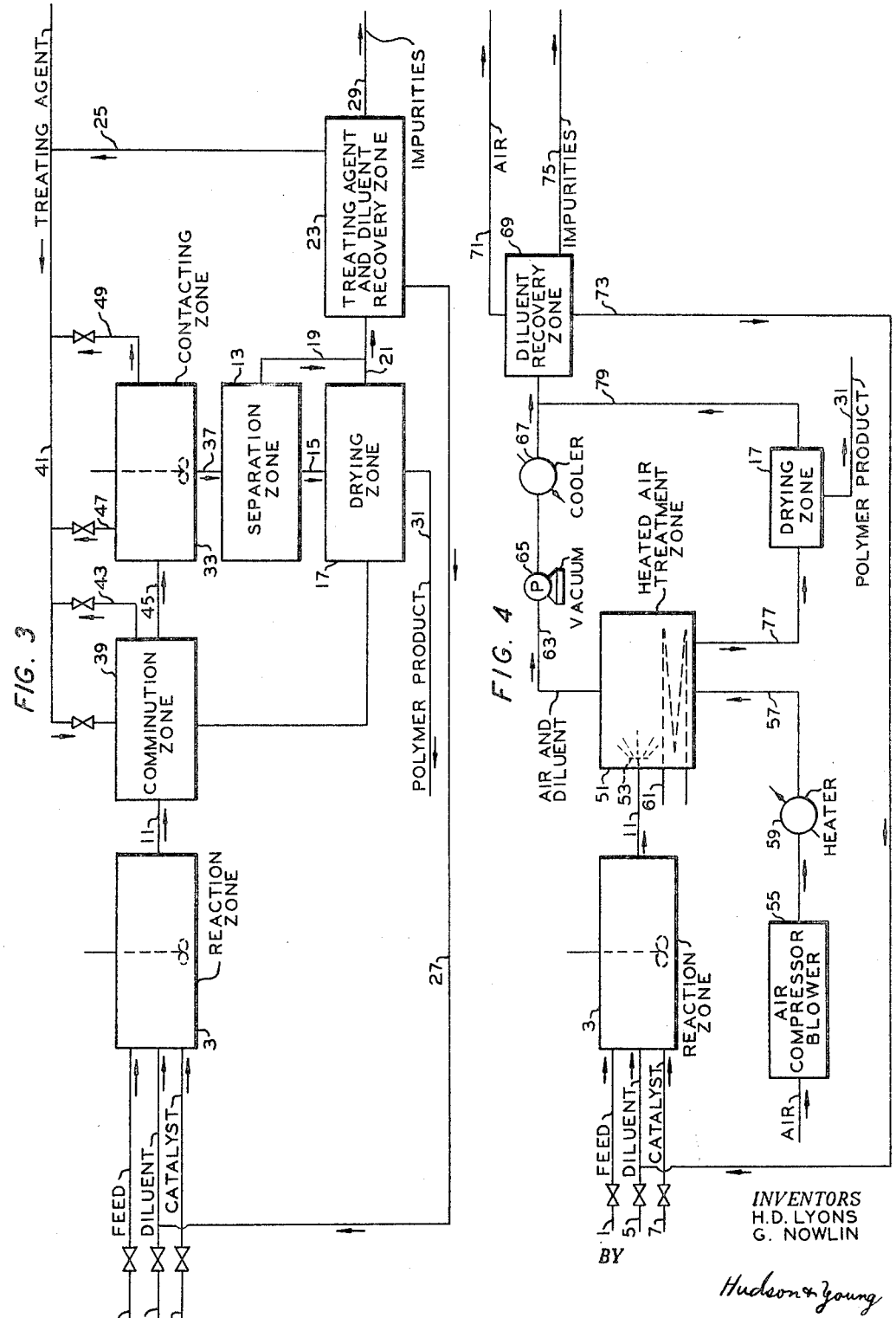

United States Patent Office 3,269,997
Patented August 30, 1966

3,269,997
PROCESS FOR PRODUCTION AND RECOVERY
OF POLYMERS
Harold D. Lyons and Gene Nowlin, Bartlesville, Okla.,
assignors to Phillips Petroleum Company, a corporation of Delaware
Filed Apr. 6, 1955, Ser. No. 499,650
6 Claims. (Cl. 260—94.9)

This invention relates to an improved process for the production and the recovery of polymers. In a more specific aspect, this invention relates to a method for producing white or colorless polymers.

Research to discover new polymerization processes is frequently directed toward processes using shorter reaction times, lower temperatures and pressures, or toward the production of polymers having specific desirable chemical and/or physical characteristics. These inventions are often the result of the discovery of new catalysts and/or new operating conditions for polymerization processes. However, often times a new process or new polymer is discovered which is a considerable advance in the art but which may be limited in use, commercially, because a dark colored polymer is produced thereby. In some applications of polymers, a dark color is not disadvantageous, but of course, in many other applications a white solid polymer or a colorless liquid polymer is required.

Precisely this situation has occurred. A process for polymerizing ethylene has been taught by the prior art, recently, which employs an organometal catalyst, such as triethylaluminum. This process produces dimers or trimers of ethylene or a waxy, low molecular weight solid polymer. The polymer produced is colorless, when a liquid, and is white, when a solid. Recently, however, new processes have been discovered which are a considerable advance over the process described above in that higher molecular weight polymers are produced and that the processes operate at lower temperature and pressures than do the related processes of the prior art. However, these new improved processes produce a polymer which has a dark color.

Each of these new processes has a common characteristic. Each of these new processes uses a colored, organometal complex catalyst comprising a Group IV metal halide. The new processes to which reference has been made are the inventions set forth in the application of J. A. Reid, Serial No. 494,281, filed March 14, 1955, now abandoned; the application of H. Lyons and G. Nowlin, Serial No. 495,054, filed March 17, 1955; and the application of J. T. Edmonds, Serial No. 496,340, filed March 23, 1955, now U.S. Patent 3,101,328. These applications cover new polymerization processes, catalysts and polymers produced thereby in the polymerization of polymerizable hydrocarbons containing a $CH_2=C<$ group and common characteristics of this invention are (1), the use of a colored organometal complex catalyst containing a Group IV metal halide and (2), the production of a colored polymeric product.

Thus, the Reid application discloses and claims a catalyst composition comprising a mixture of an organometal compound and a Group IV metal halide, such as a mixture of triethylaluminum and titanium tetrachloride, which is a colored organometal complex catalyst and which, when employed as a catalyst for polymerizing a polymerizable hydrocarbon such as ethylene, produces a dark brown solid, high molecular weight polymer.

The Lyons and Nowlin application discloses and claims a catalyst composition comprising a mixture of at least one organometal halide and a Group IV metal halide, such as a mixture of ethylaluminum dichloride, diethylaluminum chloride, and titanium tetrachloride, which is a colored, organometal complex catalyst and which, when employed as a catalyst in a process for polymerizing a polymerizable hydrocarbon such as ethylene, produces a high molecular weight solid polymer at very low temperatures and pressures. The polymer thus produced has a dark brown color.

The Edmonds application discloses and claims a novel catalyst composition comprising a mixture of an organic halide, at least one of several Group I, Group II or Group III metals and a Group IV metal halide, such as a mixture of ethyl bromide, magnesium, and titanium tetrachloride, which is a colored organometal complex catalyst and which is effective to catalyze the polymerization of a polymerizable hydrocarbon such as ethylene to a solid or liquid polymer at relatively low temperatures and pressures. The polymer produced in the process of the Edmonds' application is a gray colored polymer.

An object of this invention, therefore, is to provide an improved process for the production and recovery of polymers.

A further object of this invention is to provide a method for producing white solid or colorless liquid polymers.

A still further object is to provide a method for producing white or colorless polymers in a polymerization process which employs as a catalyst a colored organometal complex catalyst including a Group IV metal halide.

We have found that the foregoing and other objects are attained in a method for polymerizing a polymerizable hydrocarbon in the presence of a colored organometal complex catalyst comprising a Group IV metal halide by treating the polymer so produced with a polymer-decolorizing and catalyst-inactivating treating agent. It is our discovery that any treating agent which inactivates a colored organometal complex catalyst comprising a Group IV metal halide also decolorizes the polymer produced in the presence of such a catalyst when the polymer is contacted with said treating agent. The color in the polymer is discharged when it is so treated and a white solid or a colorless liquid polymer is produced as the product of the process.

As was set forth above, the polymers which are decolorized in accordance with this invention are those which are produced in the presence of a colored organometal complex catalyst comprising a Group IV metal halide. The Group IV (Mendelyeev's Periodic System) metal halides which are present in these catalysts are tri- and tetrachlorides, tri- and tetrabromides, tri- and tetraiodides and tri- and tetrafluorides of any of the Group IV metals. By Group IV metal, it is meant any or all of the metals, including titanium, silicon, thorium, zirconium, tin, lead, hafnium, germanium and cerium and silicon is defined as a Group IV metal in this specification and the appended claims. Examples of the halides of the Group IV metals which occur in the catalyst compositions which are used to produce polymers which are decolorized in accordance with this invention, are titanium tetrachloride, titanium tetrabromide, titanium trichloride, titanium tribromide, titanium trifluoride, silicon tetrachloride, silicon tetrabromide, silicon tetraiodide, zirconium tetrachloride, zirconium tetrabromide, tin tetrachloride, tin tetrabromide, lead tetrachloride, germanium tetrachloride, germanium tetrabromide, and the like.

A wide variety of normally gaseous and/or normally liquid catalyst-inactivating and polymer-decolorizing treating agents can be used in accordance with this invention. Thus, a colored polymer produced in the presence of a colored organometal complex catalyst comprising a Group IV metal halide is decolorized when treated with any one or mixtures of such treating agents as air, oxygen, carbon dioxide, carbon monoxide, hydrogen sulfide, halogens, mercaptans, hydrogen, alcohols, amines, alkali metal hydroxides, ammonium hydroxide, organic acids, ammonia, water, halogen acids and mineral acids.

The halogens which can be used as the treating agent include chlorine, bromine, iodine and fluorine.

The mercaptans which can be used as the treating agent include mercaptans corresponding to the formula RSH, wherein R is a hydrocarbon radical containing up to and including 20 carbon atoms, e.g., tert-butyl mercaptan, normal dodecyl mercaptan, tert-hexadecyl mercaptan, methyl mercaptan, ethyl mercaptan and eicosyl mercaptan.

The alcohols which can be used as the treating agent include those corresponding to the formula ROH, wherein R is a hydrocarbon radical containing up to and including 10 carbon atoms, e.g., methyl alcohol, ethyl alcohol, isopropyl alcohol, normal amyl alcohol, sec-decyl alcohol and sec-butyl alcohol.

The amines which can be used as the treating agent are primary amines corresponding to the formula $RHN_2$ and secondary amines corresponding to the formula $R_2NH$, wherein R is a hydrocarbon radical containing up to and including 20 carbon atoms, e.g., aniline dimethylamine, di-n-butylamine, di-tert-decylamine, N-methylaniline, N-ethyl-N-hexylamine and di-tert-eicosylamine.

The alkali metal hydroxides which can be used as the treating agent include sodium hydroxide, potassium hydroxide and lithium hydroxide.

The organic acids which can be used as the treating agent are those acids corresponding to the formula RCOOH, wherein R is a hydrocarbon radical containing up to and including 10 carbon atoms, e.g., acetic acid, butyric acid, propionic acid, hendecanoic acid and the like.

The halogen acids which can be used as the treating agent are those corresponding to the formula HX, wherein X is a halogen, such as chlorine, bromine, iodine or fluorine.

The mineral acids which can be used as the treating agent include sulfuric, nitric or phosphoric acid. The strength of the mineral acid used is less than that which has any degrading effect upon the polymer being treated.

Each of the foregoing treating agents can be used individually to decolorize polymer, in accordance with this invention, and mixtures of these treating agents can also be used.

As was set forth above, the process of our invention is applicable to a polymerization process for polymerizing a polymerizable hydrocarbon in which a colored, organometal complex catalyst comprising a Group IV halide is used. We have found, specifically, that polymers produced in the presence of the catalyst systems described above, i.e., the catalyst systems disclosed and claimed in the Reid application, the Lyons and Nowlin application and the Edmonds application, are decolorized when contacted wtih a catalyst-inactivating and polymer-decolorizing treating agent in accordance with this invention.

The catalyst system disclosed and claimed in the Reid application comprises a mixture of a Group IV metal halide and a member selected from the group consisting of aluminum, beryllium, gallium, and indium having the valence linkages thereof individually bound to members selected from the group consisting of hydrogen, monovalent saturated alkyl organic hydrocarbon radicals, monovalent saturated cyclo alkyl hydrocarbon radicals, and monovalent aromatic hydrocarbon radicals. For example, a polymer of ethylene produced in the presence of a catalyst mixture of triethylaluminum and titanium tetrachloride, is a dark brown colored polymer and this polymer has been found to be decolorized when treated with any one of several of our novel catalyst-inactivating, polymer-decolorizing treating agents, such as hydrogen sulfide, concentrated hydrochloric acid, isopropyl alcohol, air, sodium hydroxide, aniline, carbon dioxide and tert-butyl mercaptan.

The catalyst system disclosed and claimed in the Lyons and Nowlin application comprises a mixture of a Group IV metal halide and at least one organometal halide corresponding to the formula $R_nMX_y$, wherein R is a member selected from the group consisting of saturated acyclic hydrocarbon radicals, saturated cyclic hydrocarbon radicals, aromatic hydrocarbon radicals and combinations of the same, M is a metal selected from the group consisting of aluminum, gallium, indium, thallium and beryllium, X is a halogen, $n$ is an integer, $y$ is an integer, with the sum of $n$ and $y$ being equal to the valence of said metal. For example, a polymer of ethylene produced in the presence of a catalyst mixture comprising diethylaluminum chloride, ethylaluminum dichloride and titanium tetrachloride was a dark brown colored solid polymer and this polymer has been found to be decolorized when treated with any one of several of our novel catalyst-inactivating and polymer-decolorizing treating agents, such as air or isopropyl alcohol.

The catalyst system disclosed and claimed in the Edmonds application comprises a mixture of a Group IV metal halide, an organic halide and at least one metal selected from the group consisting of sodium, potassium, lithium, beryllium, magnesium, zinc, cadmium, mercury, aluminum, gallium, rubidium, cesium, indium and thallium. For example, a polymer of ethylene produced in the presence of a catalyst mixture comprising ethyl bromide, aluminum, magnesium, and titanium tetrachloride has a gray color and this polymer was decolorized in accordance with this invention when it was treated with hydrochloric acid or air.

Each of the foregoing catalyst systems are effective in either gas or liquid phase operations and can be used at pressures ranging from below to above atmospheric pressure. The pressure can range from atmospheric up to 20,000 or 30,000 p.s.i.g., or higher. In this connection, it is noted that it is preferred to carry out these reactions in the presence of an inert, organic hydrocarbon diluent with a pressure sufficient to maintain the diluent in the liquid phase, giving rise to so-called "mixed-phase" systems. These polymerization processes do proceed in the gaseous phase without a diluent, however. Suitable diluents which are used in these polymerization processes are paraffins, cycloparaffins and/or aromatic hydrocarbons which are relatively inert, non-deleterious and liquid under the conditions of these processes. Diluents which can be used include the alkanes, such as butane, pentane, hexane, and the like, as well as higher molecular weight paraffins and cycloparaffins, such as isooctane, cyclohexane, methylcyclohexane, and aromatic diluents, such as benzene, toluene, and the like.

The monomeric materials which are polymerized in these polymerization processes are polymerizable hydrocarbons, broadly. Preferably, the polymerizable hydrocarbons are olefins containing a $CH_2=C<$ radical. Generally, the monomeric materials are 1-olefins having up to and including 8 carbon atoms per molecule. Examples of these polymerizable hydrocarbons are ethylene, propylene, 1-butene, 1-hexane and 1-octene. Branched chain olefins are also polymerized in these processes, such as isobutylene. Also, 1,1-dialkyl-substituted and 1,2-dialkyl-substituted ethylenes are used. Di- and polyolefins in which the double bonds are in non-conjugated positions can be used in these polymerization processes, and examples of these are 1,5-hexadiene, 1,4-pentadiene and 1,4,7-octatriene. Cyclic olefins can be used, such as cyclohexene, and aryl olefins, such as styrene and alkyl-substituted styrenes, can be polymerized in these processes. Furthermore, mixtures of these polymerizable hydrocarbons can be polymerized in these processes, for example, by copolymerizing ethylene and propylene, ethylene and 1-butene, and the like.

The method of our invention is best used in the processes for polymerizing a polymerizable hydrocarbon, such as ethylene, in the presence of a colored organometal complex catalyst comprising a Group IV metal halide which are illustrated by the attached drawings, and in which.

FIGURE 3 is a modification of the continuous polymerization process wherein the total effluent from the reaction zone is comminuted either in the presence or absence of a treating agent of this invention; and FIGURE 4 is a further modification of the continuous polymerization process wherein the effluent from the reaction zone is contacted with a heated, normally gaseous treating agent of this invention.

Figure 1:
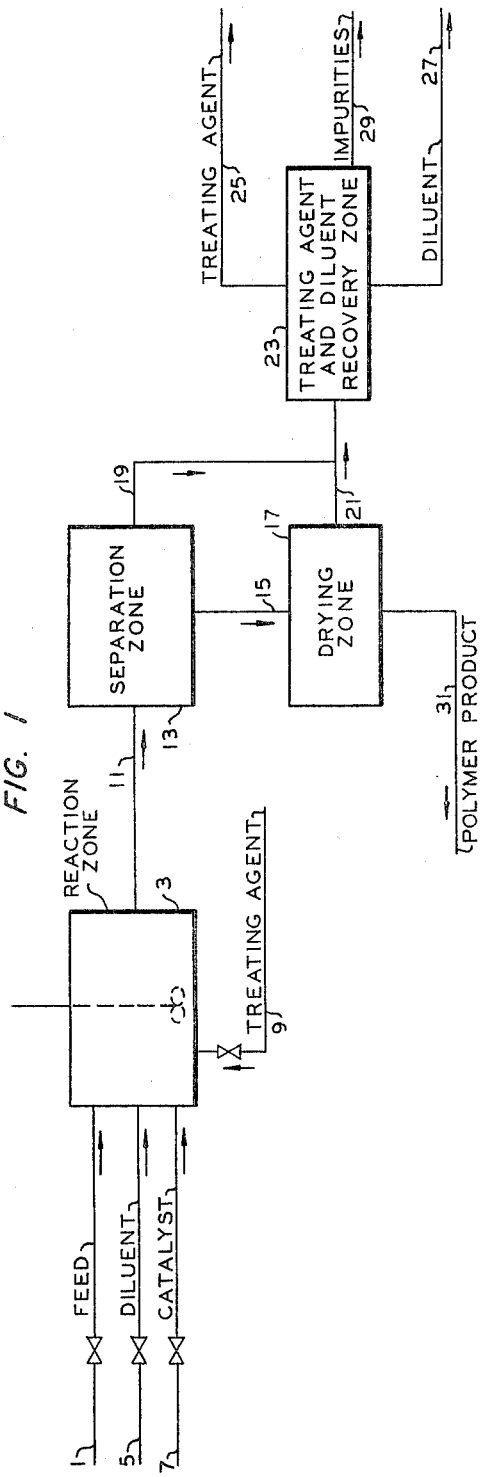
FIGURE 1 is a schematic flow diagram of a batch polymerization process wherein the polymer produced is decolorized by contacting a treating agent of this invention.

Referring now to FIGURE 1, a polymerizable hydrocarbon feed, such as ethylene, which has been purified by contacting with pyrogallol, sodium hydroxide and drying to remove carbon dioxide, oxygen and water vapor, is passed via a conduit 1 to a reaction zone 3. Reaction zone 3 is provided with a suitable stirring or agitating means so as to provide intimate contacting of the ethylene with the catalyst and the diluent, when such is used, in the reaction zone. A diluent, such as benzene, is passed via a conduit 5 to reaction zone 3. A colored organometal complex catalyst comprising a Group IV metal halide, such as a mixture (a) of triethylaluminum and titanium tetrachloride, or (b) a mixture of diethylaluminum chloride, ethylaluminum dichloride and titanium tetrachloride, or (c) a mixture of ethyl bromide, aluminum turnings, magnesium powder, and titanium tetrachloride, is passed via a conduit 7 to the reaction zone 3. The ethylene, benzene and catalyst are contacted in the reaction zone for a suitable reaction time and, when the reaction period is complete, the reactor is vented, by means not shown, to remove unreacted ethylene. A catalyst-inactivating and polymer-decolorizing treating agent of this invention is then passed via a conduit 9 to the reaction zone 3 while vigorously stirring or agitating the polymer-diluent suspension or solution. In some instances where a low molecular weight polymer is obtained or where a low concentration of polymer is present in the reaction zone, the entire amount of the polymer may be in solution in the diluent. In other cases, the polymeric product may be of such high molecular weight or may be present in a substantially greater concentration than will dissolve in the diluent and a suspension or slurry of the polymer is then present in the reaction zone.

After the reaction mixture in reaction zone 3 has been adequately contacted with the treating agent, the contents of reaction zone 3 is passed to a suitable separation zone 13, such as a filter or decanter, to separate the polymer from any free diluent and treating agent. The polymer is then passed via a conduit 15 to a drying zone 17, such as a vacuum oven or other suitable drying means for removal of the last traces of diluent and treating agent. A white solid polymer or a colorless liquid polymer is recovered from drying zone 17 via a conduit 31 as the product of the process. Diluent and treating agent are recovered from separation zone 13 via a conduit 19 and from drying zone 17 via a conduit 21 and are passed to a treating agent and diluent recovery zone 23. The treating agent and diluent recovery zone 23 can be any suitable means for separating the treating agent from the diluent, such as a fractional distillation column, and treating agent is recovered therefrom via a conduit 25 and diluent is recovered therefrom via a conduit 27. Although the color in the polymer is discharged when the polymer is contacted with a treating agent of this invention, there may be high boiling impurities which are separated from the polymer during the course of the process and these impurities are recovered from zone 23 via a conduit 29.

Figure 2:
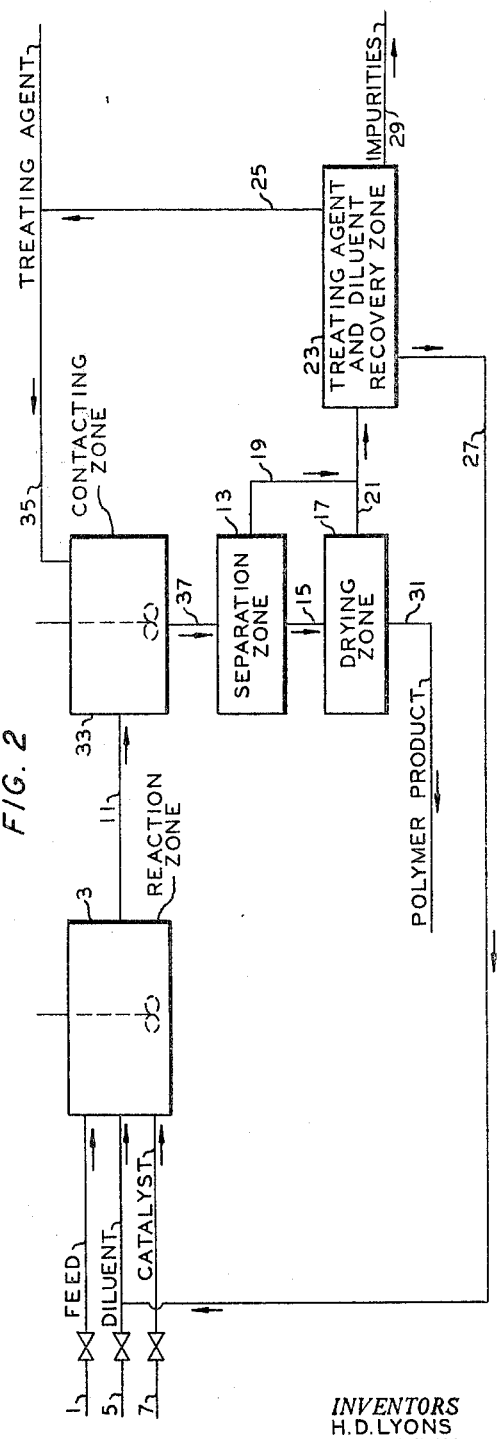
FIGURE 2 is a schematic flow diagram of a continuous polymerization process wherein the polymer produced is decolorized by contacting a treating agent of this invention.

Referring now to FIGURE 2, a continuous process is shown for producing a white solid or colorless liquid polymer in accordance with this invention. In this figure, as in the other figures, those units of the drawing which are the same are given the same reference numerals. Thus, the ethylene feed, diluent and catalyst are introduced to the reaction zone 3 in the same manner as was described in connection with FIGURE 1. However, in the continuous process of FIGURE 2, the polymerization reaction occurs continuously in reaction zone 3 and a portion of the reaction mixture is continuously withdrawn from reaction zone 3 via a conduit 11 and passed to a contacting zone 33. Contacting zone 33 is provided with a suitable stirring or agitating means and a catalyst-inactivating and polymer-decolorizing treating agent of this invention is passed via a conduit 35 to the contacting zone 33. In the case where the treating agent used is a gas, rather than liquid, the passage of the gaseous treating agent through the reaction mixture in contacting zone 33 serves to agitate the mixture adequately and a mechanical stirring or agitating means is not required. The reaction mixture in zone 33 is contacted with the treating agent for a suitable time so as to inactivate the catalyst and to decolorize the polymeric product. The mixture of the treating agent, polymer, diluent and inactivated catalyst is continuously withdrawn from contacting zone 33 via a conduit 37 and passed to the separation zone 13 described in connection with FIGURE 1. The polymeric product is passed via conduit 15 to drying zone 17 and is recovered as the product of the process via conduit 31. Diluent and treating agent are recovered from separation zone 13 and drying zone 17 via conduits 19 and 21 and are passed to the treating agent and diluent recovery zone 23. The treating agent is recovered from zone 23 continuously and is recycled via the conduit 25 to the conduit 35 for reuse in contacting the reaction mixture in contacting zone 33. Diluent is recovered in zone 23 and is recycled via the conduit 27 to conduit 5 for reuse in reaction zone 3.

Referring now to FIGURE 3, a modification of the continuous process illustrated in FIGURE 2 is shown wherein the portion of the reaction mixture withdrawn from reaction zone 3 is passed to a comminution zone 39. The use of comminution zone 39 is particularly advantageous in the case where the particles of polymer in the reaction zone effluent are too large to permit complete and rapid catalyst-inactivation and polymer-decolorization by merely stirring the reaction mixture in the presence of the treating agent. Any suitable comminuting means can be employed such as a micro pulverizer and a pulverizer such as the Entoleter pulverizer, Raymond screen pulverizer, ball mills, as well as certain types of colloid mills. The comminution of the reaction mixture in zone 39 can be done in the presence of a treating agent of this invention supplied via a conduit 41 or can be done in the absence of the treating agent. In the case where the treating agent used is a gas, the treating agent is recovered from zone 39 via a conduit 43 and passed to conduit 41 for reuse in zone 39. In the case where the treating agent used is a liquid, the mixture produced in comminution zone 39 is passed to separation zone 13. The remainder of the process then is the same as that described in connection with FIGURE 2 and the white solid polymer or colorless liquid polymer is recovered via conduit 31.

Alternatively, the reaction mixture can be comminuted in zone 39 in the absence of a treating agent and, in this case, the comminuted mixture produced in zone 39 is continuously passed via a conduit 45 to the contacting zone 33 described in connection with FIGURE 2. In this modification, the treating agent is introduced via conduit 41 and a conduit 47 to contacting zone 33 whereby the catalyst is inactivated and the polymer is decolorized. In the event that a gaseous treating agent is used in contacting zone 33, the gaseous treating agent is recovered via a conduit 49 and recycled to conduits 41 and 47 for reuse in zone 33. The decolorized mixture produced in zone 33 is passed via conduit 37 to separation zone 13, drying zone 17 and treating agent and diluent recovery zone 23, where treatment is accorded the mixture the same as described in connection with FIGURE 2.

Alternatively, the treating agent can be introduced via conduit 41 to both the comminution zone 39 and via conduit 47 to the contacting zone 33. In this modification, the reaction mixture is thoroughly comminuted and contacted in the presence of the treating agent and a finely divided white solid or colorless liquid polymer is recovered as the product of the process.

Referring now to FIGURE 4, a modification of the continuous process is shown wherein a portion of the reaction mixture produced in zone 3 is passed via conduit 11 to an open, heated air treatment zone 51. The reaction mixture is introduced to zone 51 through a spray nozzle 53 and heated air is passed through the spray of the reaction mixture to inactivate the catalyst and decolorize the polymeric product. To this end, air is supplied by an air compressor-blower 55 and passed via a conduit 57 in which is connected a heater 59 to the air treatment zone 51. A heating means 61, such as electrical heaters or tubes containing a heat exchange fluid, is provided in zone 51 to aid in heating the air and contents of zone 51. When the reaction mixture is contacted with heated air in zone 51, the diluent is vaporized and heated air and vaporized diluent are recovered from zone 51 via a conduit 63. A vacuum pump 65 is connected into conduit 63 to aid in withdrawing air and vaporized diluent from zone 51 and the latter are passed through a cooler 67 to a diluent recovery zone 69. Zone 69 can be a fractional distillation column and diluent is recovered therefrom via a conduit 73 and recycled to conduit 5 for reuse in reaction zone 3. Air which has been separated from the diluent in zone 69 is discharged therefrom via a conduit 71 and impurities separated from the diluent in zone 69 are discharged therefrom via a conduit 75.

The decolorized polymer produced in heated air treatment zone 51 is passed via a conduit 77 to the drying zone 17 described in connection with the other figures and the dried, decolorized polymeric product is recovered via conduit 31. Diluent which is separated from the polymer in drying zone 17 is recovered therefrom and passed via a conduit 79 to conduit 63 and diluent recovery zone 69.

The modification shown in FIGURE 4 has been described in connection with the use of heated air as the treating agent. However, any of the previously disclosed gaseous treating agents can be used as well as those treating agents which are normally liquids but which can be vaporized at convenient temperatures.

The length of time during which the polymer or the reaction mixture produced in the reaction zone is exposed to the treating agent depends upon which specific treating agent is being used and also depends upon the means used to contact the polymer or reaction mixture with the specific treating agent. We prefer a treating time ranging from 5 minutes to 2 hours. However, with very efficient contacting means the treating time can be reduced to as low as one minute or less. In the case where the contacting means are less efficient, longer treating times are necessary and as much as 24 hours or more may be required in this case.

The temperature at which the polymer or reaction mixture is contacted with the treating agent is usually about room temperature and preferably is not greater than the temperature of the reaction zone effluent. In any event, the temperature at which the treating agent is contacted with the polymer is below that at which any appreciable decomposition of the polymer occurs. The pressure used in contacting the polymer with the treating agent is usually atmospheric pressure, although subatmospheric or superatmospheric pressures can be used if desired.

It should be noted that the primary objective of this invention is to produce a white solid or colorless liquid polymer. In this connection, it is preferred to contact the polymer with the treating agent under conditions of temperature, pressure and concentration such that no reaction occurs between the treating agent and the polymer. In the case where oxygen or air is the treating agent, these conditions are selected, preferably, to avoid undue oxidation of the polymer or other undesirable side reactions. Also, these conditions should be controlled to avoid halogenation of the polymer when a halogen is used as the treating agent.

The amount of the treating agent used should be considerably in excess of the theoretical amount required to completely inactivate the catalyst composition present in the reaction mixture which is treated. By using a substantial excess of the treating agent, complete inactivation of the catalyst and decolorization of the polymer is assured in a single treating step.

The reaction conditions used when carrying out the polymerization of a polymerizable hydrocarbon, such as ethylene, in the presence of the catalyst composition disclosed and claimed in the Reid application, can vary widely. The temperature can range from about 30° F., or lower, to 500° F., or higher, and the preferred temperature range is from 60 to 200° F. The pressure can range from 100 to 1500 p.s.i.g. The residence time in a continuous process can vary widely and depends upon the olefin which is polymerized as well as the temperature at which the reaction is carried out. However, a residence time in the range from 1 second to an hour or more is satisfactory when an aliphatic monoolefin is polymerized within the temperature range of 60 to 200° F. Relatively small amounts of the catalyst disclosed and claimed in the Reid application are effective to initiate the polymerization reaction. When the continuous process is used, the concentration of the catalyst is usually in the range of about 0.01 weight percent to 1.0 weight percent, or higher.

The temperature used when the catalyst of the Lyons and Nowlin application is used can vary even more widely. Thus, temperatures ranging from −250° F. to 500° F. can be used. A temperature in the range from −125° F. to 200° F. is preferred when this catalyst system is employed. The pressure is usually about atmospheric, but pressures up to 20,000 or 30,000 p.s.i.g. can be used. The pressure is preferred to be in the range of 50 to 1500 p.s.i.g., and a pressure of less than 300 p.s.i.g. is usually adequate. The residence time observed in the process using the Lyons and Nowlin catalyst system can range from one second to an hour or more when an aliphatic monoolefin is polymerized at a temperature from −125° F. to 2000° F. As much as 50 to 2000 grams of polymer are obtained per gram of this catalyst composition and, when a continuous process is employed, the concentration of the catalyst composition is usually in the range from 0.01 weight percent to 1.0 weight percent. In this catalyst composition disclosed and claimed in the Lyons and Nowlin application, the organometal halide and Group IV metal halide are used in the catalyst composition in the ratio of 0.05 to 20 mols of the organometal halide per mol of the Group IV metal halide.

The temperature maintained when the catalyst system disclosed and claimed in the Edmonds application is used is in the range from 100 to 500° F. and is preferably from 200 to 350° F. The pressure is in the range from 100 to 1500 p.s.i.g. and is preferably in the range from 100 to 500 p.s.i.g. When an aliphatic monoolefin is polymerized in the presence of this catalyst system at a temperature in the range from 200 to 350° F., the residence time employed is in the range from one second to an hour or more. In the batch process, the time for the reaction can vary widely, such as up to 24 hours or more. Relatively small amounts of this catalyst composition provide the desired activating effect when the polymerization reaction is carried out as a batch process. When the continuous system is employed, the concentration of the total catalyst composition is usually in the range from 0.01 weight percent to 1.0 weight percent, or higher. The ratio of the amounts of organic halide, metal, and Group IV metal halide in the catalyst compositon of the Edmonds application is usually in the range from 0.02 to 50 mols of the organic halide per mol of the Group IV metal halide and from 0.02 to 50 mols of the metal per mol of the Group IV metal halide. Preferably, the range of the ratio of the amounts of the components of this catalyst system is from 0.2 to 5 mols of organic halide per mol of the Group IV metal halide and from 0.2 to 5 mols of the metal per mol of the Group IV metal halide.

The following examples are supplied to illustrate the effectiveness of our invention when colored polymers are contacted with a catalyst-inactivating and polymer-decolorizing treating agent of this invention and these polymers are thereby decolorized. These examples are illustrative, only, of the process of this invention as set forth in the foregoing description and should not be used to unduly restrict the scope of this invention.

Example I

Polyethylene prepared according to the method described below has been treated with several treating agents to deactivate the catalyst and decolorize or substantially reduce the color intensity of the polymer. The catalyst employed in the polymerization comprised two grams of triethylaluminum and 3.35 grams of titanium tetrachloride dissolved in 1200 cubic centimeters of benzene. These materials were charged to a stainless steel reactor maintaining a nitrogen atmosphere to exclude moisture and air. The catalyst mixture was heated to about 212° F. and ethylene was pressured into the vessel, maintaining the pressure at approximately 300 p.s.i.g. Ethylene was added periodically to maintain this pressure. The temperature of the reaction mixture increased gradually to about 225° F. over a period of about 4½ hours. The volume of ethylene added was calculated on the basis of pressure drop as about 1140 grams. A dark brown solid ethylene polymer swollen with benzene was obtained.

Example II

About 30 grams of the polyethylene wet with benzene produced in Example I was treated with about 400 cubic centimeters of tert-butyl mercaptan in a Waring Blendor for approximately 30 minutes. The slurry of finely divided polymer was filtered, washed with benzene to remove unreacted mercaptan and the product dried in a vacuum oven. The dark brown color was removed, leaving a yellowish-green tint in the polymer. This color appeared to be similar to that of the mercaptan which was used as the treating agent. After several hours exposure to the atmosphere this finely divided product became somewhat lighter in color.

Example III

A second portion of about 30 grams of the polymer wet with benzene produced in Example I, was covered with an additional portion of benzene and maintained in an atmosphere of dry nitrogen to protect it from the air and moisture. A small amount of solid carbon dioxide was added and the mixture was stirred until it froze into a solid mass. After standing overnight the mixture had warmed up to room temperature and the solid polymer was filtered from the benzene and dried in a vacuum oven. The color of the dry polymer was a light tan and it is believed that this may have been due to incomplete contacting of the polymer particles with the carbon dioxide. With more efficient contacting a colorless product would have been obtained.

Example IV

Approximately 30 grams of polymer wet with benzene produced in Example I was treated with about 400 cubic centimeters of aniline in a Waring Blendor for approximately 30 minutes. The slurry of finely divided polymer was filtered, and the product dried in air. The dry product was tan in color. This product did not appear to undergo any further color change on standing and it is believed that the residual color was due to the color of the aniline which was used as a treating agent.

Example V

Hydrogen sulfide was bubbled into about 400 cubic centimeters of water until saturation was reached. Approximately 30 grams of the polymer wet with benzene produced in Example I was added to the solution of hydrogen sulfide and this mixture was stirred in a Waring Blendor for about 30 minutes. The slurry of finely divided polymer was filtered, and then was dried in air. The dry polymer was substantially white in color.

Example VI

About 30 grams of polymer wet with benzene produced in Example I was treated with about 400 cubic centimeters of concentrated hydrochloric acid in a Waring Blendor for about 30 minutes. The slurry of finely divided polymer was filtered, washed with water to remove unreacted hydrochloric acid and the product was dried in air. The dry polymer which was recovered was white.

Example VII

About 200 grams of the polymer wet with benzene produced in Example I was treated with about 400 cubic centimeters of isopropyl alcohol in a Waring Blendor for about 30 minutes. The slurry of finely divided polymer was filtered, and then was dried in a vacuum oven. After drying the polyethylene was white in color.

Example VIII

About 30 grams of polymer wet with benzene produced in Example I was treated with approximately 400 cubic centimeters of a 10 percent solution of sodium hydroxide in a Waring Blendor for about 30 minutes. The slurry of finely divided polymer was filtered, washed with water to remove unreacted sodium hydroxide and then was dried in air. The dry polymer was white in color.

Example IX

A polymer of ethylene was prepared by polymerization in the presence of a catalyst comprising one gram of triethylaluminum and 5 grams of titanium tetrachloride in 1200 cubic centimeters of benzene. The catalyst diluent mixture was initially maintained at about 70° F. as the addition of ethylene was started. Polymerization occurred immediately upon adding ethylene to the reactor and the temperature increased from about 70° F. to 210° F. in 3½ minutes. The temperature then gradually dropped to about 155° F. at the end of the next 11½ minutes. During this 15-minute reaction period a maximum pressure of 250 p.s.i.g. was reached in the reactor. About 240 grams of a dark brown polymer was recovered from the reaction mixture. After filtering off the benzene, the polymer was spread out on large porcelain plates and allowed to stand in air overnight. After this exposure to air the solvent had evaporated and the polymer was white in color.

Example X

A catalyst composition consisting of a mixture of 3.55 grams of titanium tetrachloride and 4 grams of a mixture of diethylaluminum chloride and ethylaluminum dichloride was prepared.

The mixture of diethylaluminum chloride and ethylaluminum dichloride was prepared by placing 150 grams of aluminum shavings in a flask fitted with a reflux condenser and heated to about 70° C. A trace of iodine was added to the flask to act as a catalyst and ethyl chloride was charged to the flask in liquid phase. The temperature of the reaction mixture was maintained in the range of 120 to 150° C. during the addition of ethyl chloride and the reaction mixture was maintained under a nitrogen atmosphere. When substantially all of the aluminum shavings had reacted with the ethyl chloride, the liquid product was removed from the flask and fractionally distilled at 4.5 millimeters mercury pressure in a packed distillation column. Four grams of the distillate, boiling at 72 to 74° C. at 4.5 millimeters mercury pressure, was used in the catalyst composition of this invention, as set forth above. This fraction boiling at 72 to 74° C. was analyzed and was found to contain 47.4 weight percent chlorine. The theoretical chlorine content for an equimolar mixture of diethylaluminum chloride and ethylaluminum dichloride is 43 weight percent.

Ethylene was polymerized in a 1200 cubic centimeter, stainless steel rocking autoclave in the presence of 7.55 grams of the catalyst of this invention and described above, i.e., 4 grams of the mixture of diethylaluminum chloride and ethylaluminum dichloride mixed with 3.55 grams of titanium tetrachloride. The catalyst was dissolved in 500 cubic centimeters of benzene and charged to the autoclave while maintaining the autoclave under a nitrogen atmosphere. The ethylene was passed through a purification system comprising contacting with pyrogallol, sodium hydroxide and drying, to remove water vapor, oxygen and carbon dioxide and then charged to the autoclave while maintaining the catalyst and diluent at atmospheric pressure. The polymerization of the ethylene was initiated immediately and as the addition of ethylene continued the temperature of the reaction mixture increased rapidly to 175° F. The ethylene was passed into the autoclave as rapidly as the limitations of the purification system would permit. Maximum pressure reached in the autoclave was 300 p.s.i.g. At the end of a 15-minute reaction period the bomb was opened and the polymer of ethylene was present as a dark brown solid suspension in the benzene solvent. One hundred cubic centimeters of normal butyl alcohol was added to the autoclave to kill the catalyst. The solid polymer was filtered from the benzene-alcohol mixture and was then washed with isopropyl alcohol. After filtering the polymer from the isopropyl alcohol it was dried in a vacuum oven at about 140° F. overnight. About 100 grams of a white solid polyethylene was obtained.

*Example XI*

The polymerization of ethylene was carried out under the following conditions in a stainless steel rocking autoclave of 1200 cubic centimeter capacity. Four hundred milliliters of benzene (which had been distilled from sodium) was charged to the autoclave, maintaining a nitrogen blanket in the autoclave. To this was added 7.1 grams of ethyl bromide, 0.59 gram of aluminum turnings, 1.6 grams of magnesium powder and 0.569 gram of titanium tetrachloride. Ethylene which had been purified by passage through pyrogallol, sodium hydroxide and drying to remove carbon dioxide, oxygen and water vapor was then pressured into the autoclave at 70° F. to a pressure of 300 p.s.i. The autoclave was then heated up gradually over a period of about two hours and 40 minutes to a temperature of 290° F. and 650 p.s.i.g. pressure. At this point the polymerization reaction was initiated. The temperature was then held at 275° to 330° F. for about one hour and 40 minutes and the pressure was maintained in the range of 100 to 500 p.s.i.g. by pressuring in ethylene periodically as necessary. At the end of this reaction period the reactor was cooled and vented and about 100 milliliters of isopropyl alcohol was added. A dark-colored solid polymer, which was present as a suspension in the mixture of benzene and alcohol, was obtained. This material was decanted from the aluminum turnings, which remained in the bottom of the autoclave. The suspension was warmed on the steam bath for about one-half hour, was removed from the steam bath, and was diluted with about 500 milliliters of methyl alcohol. This suspension of solid polymer was stirred in a Waring blender for about 5 minutes and then the finely divided product was recovered by filtration. The powder which was obtained was gray in color. One-half of the gray-colored polymer was washed with about 250 milliliters of water, which contained 5 milliliters of concentrated hydrochloric acid. A white powder was recovered by filtration from the aqueous phase. The second portion was treated in the same manner and the total polymer was then washed twice with water to remove any water-soluble salts. The product was finally washed with methyl alcohol and dried in air for aproximately 18 hours. About 54 grams of a finely divided white polymer of ethylene was obtained as the product.

The polymers and copolymers produced in accordance with this invention have utility in applications where solid plastics are used. They can be molded to form articles of any desired shape, such as bottles and other containers for liquids. Also, they can be formed into pipe or tubing by extrusion.

It is to be noted that the step of comminuting a polymer swollen with a solvent, such as benzene, in the presence of a dispersing agent, such as an alcohol, is disclosed and claimed as the invention of R. V. Jones, Serial No. 499,768, filed of even date with instant application, now U.S. Patent 2,870,113.

As will be evident to those skilled in the art, many variations and modifications can be practiced within the scope of the disclosure and the claims to this invention. The invention resides in an improvement in a method for polymerizing a polymerizable hydrocarbon in the presence of a colored organometal complex catalyst comprising a Group IV metal halide to form a colored polymer of said hydrocarbon whereby said polymer is treated with a polymer-decolorizing and catalyst-inactivating treating agent and a substantially color-free polymer is recovered.

We claim:

1. The process for the low pressure polymerization of an olefin in a hydrocarbon diluent containing a catalytic amount of a catalyst comprising an alkyl aluminum compound and a salt of a metal of subgroup IV of the periodic table, the improvement comprising removing the catalyst residues from the polyolefin by adding an alkaline compound to the suspension of the polyolefin in said hydrocarbon diluent, stirring the resulting mixture, and then separating the solid polyolefin from said mixture.

2. The process of claim 1 wherein the alkaline compound is inorganic.

3. The process of claim 1 wherein the alkaline compound is organic.

4. The process of claim 1 wherein the polyolefin is washed with water after being filtered from supension.

5. A method in accordance with claim 1 wherein said alkaline compound is an alkali metal hydroxide.

6. The process of claim 1 wherein the catalyst comprises a titanium halide and an alkyl aluminum compound.

References Cited by the Examiner

UNITED STATES PATENTS

| | | | |
|---|---|---|---|
| 2,183,556 | 12/1939 | Fawcett | 260—94.9 |
| 2,461,966 | 2/1949 | Davis | 260—94.9 |
| 2,494,588 | 1/1950 | Skooglund | 23—285 |
| 2,691,647 | 10/1954 | Field et al. | 260—93.7 |
| 2,721,189 | 10/1955 | Anderson et al. | 260—93.1 |
| 2,838,477 | 6/1958 | Roelen et al. | 260—96 |
| 2,905,645 | 9/1959 | Anderson et al. | 252—429 |

(Other references on following page)

FOREIGN PATENTS 533,362   5/1954   Belgian.

OTHER REFERENCES

Parks: "Mellors Modern Inorganic Chemistry," Longmans, Green and Co. (1939), page 712.

JOSEPH L. SCHOFER, *Primary Examiner.*

WILLIAM BENGEL, ALLEN M. BOETTCHER, BEN E. LANHAM, LESLIE H. GASTON, MORRIS LIEBMAN, *Examiners.*

H. N. BURSTEIN, R. W. GRIFFIN, F. L. DENSON, *Assistant Examiners.*